United States Patent [19]

Hohmann et al.

[11] 4,056,544
[45] Nov. 1, 1977

[54] ANTHRAQUINONE COMPOUNDS

[75] Inventors: Walter Hohmann, Leverkusen; Helmut Herzog, Bergisch-Neukirchen; Hans-Samuel Bien, Burscheid, all of Germany

[73] Assignee: Bayer Aktiengesellschaft, Leverkusen, Germany

[21] Appl. No.: 443,119

[22] Filed: Feb. 15, 1974

[30] Foreign Application Priority Data

Feb. 16, 1973 Germany .............. 2307591

[51] Int. Cl.$^2$ .............................................. C09B 1/16
[52] U.S. Cl. .................................................. 260/378
[58] Field of Search ....................................... 260/378

[56] References Cited

U.S. PATENT DOCUMENTS

| | | | |
|---|---|---|---|
| 1,828,588 | 10/1931 | Bally et al. | 260/378 |
| 1,898,750 | 2/1933 | Thomson et al. | 260/378 |
| 2,273,966 | 2/1942 | Klein | 260/378 |
| 2,727,045 | 12/1955 | McSheehy | 260/378 |
| 2,759,940 | 8/1956 | Bucheler et al. | 260/378 X |
| 3,123,605 | 3/1964 | Turetzky et al. | 260/378 X |
| 3,444,214 | 5/1969 | Buecheler | 260/378 |
| 3,462,463 | 8/1969 | Schwander | 260/378 X |
| 3,499,915 | 3/1970 | Schwander et al. | 260/378 X |
| 3,686,232 | 8/1972 | Hohmann et al. | 260/378 X |
| 3,724,998 | 4/1973 | Gehrke et al. | 260/378 X |

FOREIGN PATENT DOCUMENTS

| | | | |
|---|---|---|---|
| 1,292,639 | 3/1962 | France | 260/378 |
| 144,634 | 2/1901 | Germany | 260/378 UX |
| 1,271,285 | 6/1968 | Germany | 260/378 |

Primary Examiner—Paul F. Shaver
Attorney, Agent, or Firm—Plumley and Tyner

[57] ABSTRACT

Compounds of the formula

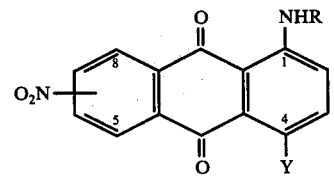

wherein
R represents cycloalkyl or the

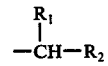

group wherein $R_1$ and $R_2$ denote alkyl and
Y denotes hydrogen, chlorine, bromine, amino, alkylamino, cycloalkylamino, aralkylamino, arylamino, acylamino or arylmercapto, with the proviso that the nitro group is in the 5- or 8-position of the anthraquinone nucleus if Y denotes hydrogen as well as their production and their use for the dyeing of synthetic fibres.

5 Claims, No Drawings

ANTHRAQUINONE COMPOUNDS

The invention relates to compounds of the formula I

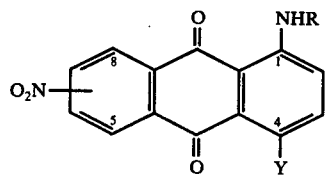

wherein
R represents cycloalkyl or the

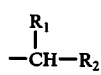

group
wherein
R₁ and R₂ denote alkyl, and
Y denotes hydrogen, chlorine, bromine, amino, alkylamino, cycloalkylamino, aralkylamino, arylamino, acylamino or arylmercapto, with the proviso that the nitro group is in the 5- or 8-position of the anthraquinone nucleus if Y denotes hydrogen
an to their preparation and use. Dyestuffs of the formula I wherein Y has a meaning other than —NHR are preferred.

For Y, preferred alkylamine radicals are those with 1–6 C atoms, preferred cycloalkylamine radicals are cyclohexylamine radicals, preferred aralkylamine radicals are phenyl-$C_{1-7}$-alkylamine radicals, preferred arylamine radicals are phenylamine radicals and preferred arylmercapto radicals are phenylmercapto radicals.

Suitable acylamine radicals are $C_{1-8}$-alkylcarbonylamino, $C_{1-4}$-alkylsulphonylamino, $C_{1-4}$-alkoxycarbonylamino, cyclohexylcarbonylamino, phenyl-$C_{1-4}$-alkylcarbonylamino, phenyl-$C_{1-4}$-alkenylcarbonylamino, phenylcarbonylamino, phenylsulphonylamino and phenoxysulphonylamino radicals. The alkyl, cyclohexyl and phenyl radicals mentioned in an context can in turn be substituted by 1–3 substituents of the following nature: alkoxy radicals with 1–4 C atoms, amino groups, alkylcarbonylamino groups with 2–6 C atoms, alkylmercapto radicals with 1–4 C atoms, alkylsulphonyl radicals with 1–4 C atoms, nitrile, chlorine, bromine, fluorine, alkylsulphonylamino groups with 1–4 C atoms, alkylaminosulphonyl groups with 1–4 C atoms and aryloxysulphonyl groups. The cyclohexyl and phenyl radicals can furthermore be substituted by alkyl radicals with 1–4 C atoms, hydroxyalkyl radicals with 1–4 C atoms, alkoxyalkyl radicals with 1–6 C atoms, cyclohexyl radicals and phenyl radicals.

A preferred group of compounds which corresponds to the formula I are those of the formula II

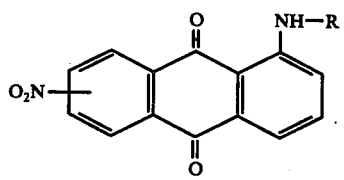

in which
R has the abovementioned meaning and the nitro group is in the 5- or 8-position.

A further preferred group of compounds which corresponds to the formula I are those of the formula II

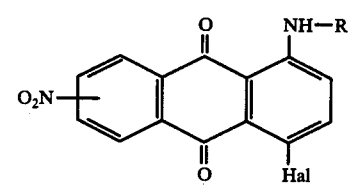

in which
R has the abovementioned meaning and
Hal represents chlorine or preferably bromine.

A further preferred group of compounds which corresponds to the formula I are those of the formula IV

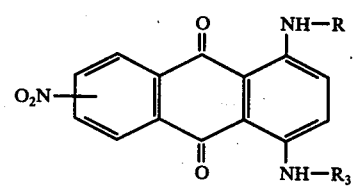

in which
R has the abovementioned meaning, the nitro group is in the 5- or 8-position and
R₃ represents cyclohexyl or

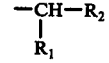

wherein
R₁ and R₂ have the abovementioned meanings with the proviso that R₅ differs from R.

A preferred group of compounds which corresponds to the formula I are also those of the formula V

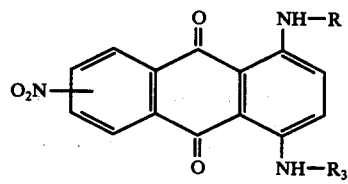

in which
R and R₃ have the meaning mentioned and the nitro group is in the 6- or 7-position with the proviso that R₃ is different from R.

A further preferred group of compounds which corresponds to the formula I are those of the formula VI

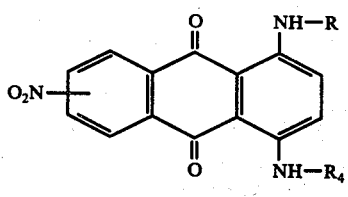

in which
R has the meaning mentioned, $R_4$ represents an aryl radical and the nitro group is in the 5- or 8-position.

A further preferred group of compounds which corresponds to the formula I are those of the formula VII

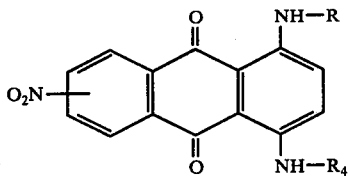

in which

R and $R_4$ have the meaning mentioned and the nitro group is in the 6- or 7-position.

A further preferred group of compounds which corresponds to the formula I are those of the formula VIII

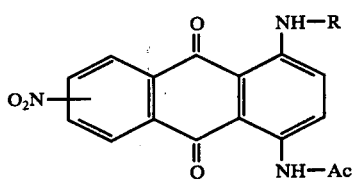

in which

R has the indicated means and

Ac represents an acyl radical, preferably a $C_{1-8}$-alkylcarbonyl or $C_{1-4}$-alkylsulphonyl radical and the nitro group is in the 5- or 8-position.

A further preferred group of compounds which corresponds to the formula I are those of the formula IX

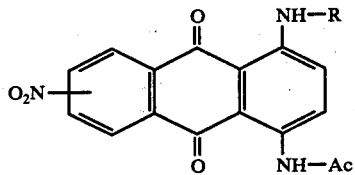

in which

R and Ac have the indicated meaning and the nitro group is in the 6- or 7-position.

Within the compounds corresponding to the formulae IV-IX, those in which

R represents a

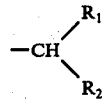

group
wherein $R_1$ and $R_2$ have the indicated meaning but preferably represent $C_{1-4}$-alkyl are, in turn, preferred.

Examples of the groups indicated in the formula I are:

for R = cycloalkyl: cyclopentyl, cycloheptyl and preferably cyclohexyl radicals which can be substituted by $C_{1-4}$-alkyl, hydroxy, $C_{1-4}$-alkoxy, amino, $C_{1-4}$-alkylamino, acylamino, especially $C_{2-6}$-alkylcarbonylamino, chlorine, bromine, or $C_{1-4}$-alkymercapto.

for $R_1$ and $R_2$: methyl, ethyl, n- or iso-propyl, n- or iso-butyl, hydroxymethyl, methoxymethyl, hydroxyethyl and methoxyethyl radicals.

for Y = alkylamino: radicals wherein alkyl has the following meanings: methyl, ethyl, n- or iso-propyl, n- or iso- or tert.-butyl, n- or iso-pentyl, n- or iso-hexyl, n-dodecyl, β-chloroethyl, β,β,β-trifluoroethyl, β,γ-dichloropropyl, β-cyanoethyl, β-cyanoethoxyethyl, β-methoxyethyl, -methoxybutyl, β-hydroxyethyl, β,γ-dihydroxypropyl, β-methoxycarbonylethyl, β-propoxycarbonylethyl, β-cyanoalkoxycarbonylethyl, β-methoxycarbonylpropyl, β-acetylaminoethyl, β-acetoxyethyl, β-propoxyethyl, β-acetylaminopropyl, β-methylsulphonylethyl, β-ethylsulphonylethyl, γ-aminopropyl, β-diethylaminoethyl, β-ethylsulphonylethyl, β-hydroxyethylmercaptoethyl and β-bromoethyl.

for Y = cycloalkylamino: radicals wherein cycloalkyl has the following meanings: cyclohexyl, cyclohexyl monosubstituted or polysubstituted in the 2–6-positions by identical or different substituents of the following nature: $C_{1-4}$-alkyl, hydroxy, $C_{1-4}$-alkoxy, amino, $C_{1-4}$-alkylamino, acylamino, especially $C_{2-6}$-alkylcarbonylamino, chlorine, bromine and $C_{1-4}$-alkylmercapto; cyclopentyl and cycloheptyl.

for Y = aralkylamino: radicals wherein aralkyl has the following meanings: phenyl-$C_{1-8}$-alkyl optionally substituted further in the phenyl radical by chlorine, fluorine, bromine, $C_{1-4}$-alkyl, $C_{1-4}$-alkoxy, amino, nitro or $C_{2-5}$-alkylcarbonylamino; for example, phenylmethyl, α- or β-phenylethyl, γ-phenylpropyl, γ-phenyl-α-methylpropyl, γ-phenyl-α,γ,γ-trimethylpropyl, α-isopropyl-γ-phenylpropyl, α-cyclohexyl-γ-phenylpropyl or α-[β-phenylethyl]-γ-methyl-butyl.

for Y = arylamino: radicals wherein aryl has the following meanings: phenyl, naphthyl, methylphenyl, 2,6-dimethyl-phenyl, 2,4,6-trimethylphenyl, ethylphenyl, tert.-butyl-phenyl, 2-methyl-6-ethyl-phenyl, 2,4-dimethyl-6-ethylphenyl, chlorophenyl, bromophenyl, fluorophenyl, cyanophenyl, methoxyphenyl, ethoxyphenyl, β-hydroxyethoxyphenyl, β-cyanoethoxyphenyl, 3-chloro-4-methoxy-phenyl, 2-methyl-4-methoxyphenyl, 2,5-diethoxy-phenyl, biphenylyl, cyclohexylphenyl, 2,5-dimethoxy-phenyl, methylthio-phenyl (β-hydroxyethylsulphonyl)-phenyl, amino-phenyl, acetylaminophenyl, N-methylacetylamino-phenyl, -N-cyclohexylacetylaminophenyl, hydroxyacetylaminophenyl, methoxacetylaminophenyl, phenoxysulphonylphenyl, sulphamoylphenyl, alkylaminosulphonylphenyl, β-hydroxyethoxyethoxyphenyl, γ-hydroxypropoxyphenyl, β-hydroxyethylmercaptophenyl, N-(β-hydroxyethylamino)-carbonylphenyl, β,γ-dihydroxypropoxyphenyl, o- or p-(triflouromethoxy)-phenyl, 2-ethoxy-naphthyl, 6-hydroxy-α-naphthyl and 3-hydroxy-β-napthyl.

for Y = NH-acyl there may be mentioned: $C_{1-8}$-alkylcarbonylamino groups, such as methylcarbonylamino, ethylcarbonylamino, propenylcarbonylamino, isovalerylamino, chloromethylcarbonylamino, dichloromethylcarbonylamino, β-chloroethylcarbonylamino, γ-chloropropylcarbonylamino and β-cyanoethylcarbonylamino, $C_{1-4}$-alkylsulphonylamino radicals such as methylsulphonylamino, ethylsulphonylamino and butylsulphonylamino radicals, $C_{1-4}$-alkoxycarbonylamino radicals, such as methoxycarbonylamino, ethoxycarbonylamino, propoxycarbonylamino and butoxycarbonylamino, cycloalkylcarbonylamino radicals such as cyclohexylcarbonylamino, o-, m- or p-methylcyclohexylcarbonylamino and o-, m- or p-chlorocyclohexylcarbonylamino, phenyl-C$_{1-4}$-alkyl- or alkenyl-carbonylamino radicals, such as phenylacetylamino, phenylpropionylamino, phenylbutyrylamino and cinnamoylamino, phenylcarbonylamino radicals such as phenylcarbonylamino, o-, m- or p-methylphenylcarbonylamino, p-tert.-butylphenylcarbonylamino, p-chlorophenylcarbonylamino, m-bromophenylcarbonylamino, m- or p-nitrophenylcarbonylamino, p-hydroxyphenylcarbonylamino and m- or p-methoxyphenylcarbonylamino, phenylsulphonylamino radicals such as phenylsulphonylamino, m- or p-methylphenylsulphonylamino, m-p-nitrophenylsulphonylamino, m- or p-methoxyphenylsulphonylamino, m-p-chlorophenylsulphonylamino and p-acetylaminophenylsulphonylamino and phenoxysulphonylamino groups such as phenoxysulphonylamino, p-nitrophenoxysulphonylamino, m- or p-methylphenoxysulphonylamino and m-p-methoxyphenylysulphonylamino.

for Y = S-aryl: thiophenyl, α- or β/thionaphthyl, o-, m- or p-methylthiophenyl, o-, m- or p-ethylthiophenyl, o- or p-tert.-butylthiophenyl, o- or p-iso-propyl-thiophenyl, 2,5- or 2,6-dimethyl-thiophenyl, 2,4,6-trimethyl-thiophenyl, 2-methyl-4-tert.-butyl-thiophenyl, 1-isopropyl-5-methyl-thiophenyl, nonylthiophenyl, dodecylthiophenyl, p-methoxythiophenyl, ethoxythiophenyl, isopropoxythiophenyl, phenoxythiophenyl, diethoxythiophenyl, o-, m- or p-chlorothiophenyl, o-, m- or p-bromothiophenyl, p-fluorothiophenyl, 2,5- or 2,6-dichloro-thiophenyl, 2,4,6-tribromo-thiophenyl, trifluoromethylthiophenyl, p-hydroxyethylthiophenyl, m- or p-methyl- or ethylsulphonylthiophenyl, m- or p-carbethoxythiophenyl, o-carbopropoxythiophenyl, 2-methyl-4-chloro-thiophenyl, 2-methoxy-4-chloro-thiophenyl, 2-methoxy-5-methyl-thiophenyl, 3-methoxy-4-bromo-thiophenyl, 2-bromo-4-tert.-butyl-thiophenyl, 4-bromo-2-isopropyl-thiophenyl, -p-acetylamino-thiophenyl, p-butyrylamino-thiophenyl and o- or p-nitro-thiophenyl.

The new compounds of the formula I can in general be prepared by reacting dinitroanthraquinones of the formula

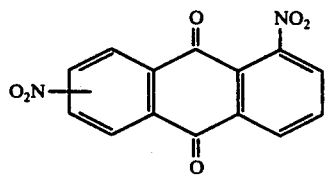
(X)

with amines of the formula

wherein

R has the abovementioned meanings with replacement of a nitro group, to give compounds of the formula

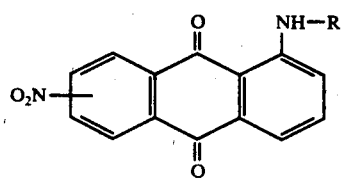
(XI)

optionally thereafter introducing a chlorine or bromine atom into the 4-position of the anthraquinone skeleton by the action of halogenating agents, and optionally subsequently replacing this in a manner which is in itself known by an amino, alkylamino, cycloalkylamino, arylamino, acylamino or arylmercapto radical.

The replacement of the nitro group is preferably carried out in the presence of solvents, preferably solvents of organic nature.

Suitable solvents can be of either hydrophobic or hydrophilic nature, for example halogenated or nitrated hydrocarbons of the aliphatic or aromatic series, for example α,β-dichloroethane, o-dichlorobenzene, nitrobenzene, tertiary bases of aliphatic or aromatic nature, for example pyridine and triethanolamine, and also dioxane, dimethylformamide, dimethylsulphoxide and sulpholane. An excess of amines of the formula NH$_2$-R can also be employed with advantage.

To neutralise the nitrous acid first split off during the reaction, acid-binding agents, such as alkaline earth metal salts or preferably alkali metal salts of weak inorganic or organic acids, for example of carbonic acid or acetic acid, or tertiary organic bases, for example pyridine or inorganic bases, for example magnesium oxide, can also be added.

The reaction temperatures depend on the nature of the amine to be reacted and on the concentration of the reactants. They can be 50°-200°, but preferably 100°-180°.

The reaction products can be isolated in a manner which is in itself known.

It is possible to use either pure 1,5- and 1,8-dinitroanthraquinone or - with particular technical and economic advantage - a mixture of the two components.

The halogenation of the compounds of the formula XI is preferably carried out in solvents, for example in optionally aqueous mineral acids, such as hydrochloric acid or sulphuric acid, or in organic solvents, such as nitrobenzene, dimethylformamide, pyridine or acetic acid. Possible halogenating agents are chlorine and preferably bromine and also thionyl chloride, sulphuryl chloride, thionyl bromide, sulphuryl bromide, sulphur-halogen compounds and chlorineiodine compounds.

The reactions can be carried out at 0°-150°, but preferably at room temperature or slightly elevated temperature. Catalysts which are in themselves known, for example iodine, flowers of sulphur or halogen compounds of iron, can be added.

Compounds of the formula I wherein Y = alkylamino, cycloalylkamino, aralkylamino or arylamino can be obtained from compounds of the formula I wherein Y = chlorine or preferably bromine by reaction with optionally substituted alkylamines, cycloalkylamines, aralkylamines or arylamines, by reaction procedures which are in themselves known. These reactions can be carried out in an aqueous, aqueous-organic or, preferably, organic medium, preferably in the presence of copper and/or copper salts and/or, optionally, iodine as catalysts and optionally with the addition of acid-binding agents, such as the alkaline earth metal salts or preferably alkali metal salts of acetic acid or carbonic acid or of organic tertiary bases, for example pyridine or triethanolamine.

Depending on the nature of the amine and of the substituents to be replaced, temperatures between 60° and 160° are required for the reaction.

As a rule, the replacement of chlorine demands higher temperatures than that of bromine. If the nitro group is in the 5-position or 8-position of the anthraquinone, it is preferably replaced by arylamines.

Compounds of the formula I wherein Y = NH-acyl can be obtained, by reaction procedures which are in themselves known, either from compounds of the formula I with Y = NH$_2$ by acylation with acylating agents or from compounds of the formula I wherein Y = chlorine or preferably bromine by reaction with compounds of the formula

H$_2$N—SO$_2$—R$_5$ in which

R$_5$ represents an optionally substituted phenyl radical. Possible acylating agents are above all the chlorides or anhydrides of acids corresponding to the abovementioned acyl radicals.

Compounds of the formula I wherein Y = NH$_2$ can easily be obtained according to methods which are in themselves known by hydrolysis of compounds of the formula I wherein Y denotes optionally substituted phenylsulphonylamino, for example in optionally aqueous mineral acids, for example sulphuric acids, or by splitting off the hydrocarbon radical R in compounds of the formula I in which Y = NH-R$_6$, wherein R$_6$ is split off under mild conditions by acid agents, for example H$_2$SO$_4$— for example if R$_6$ represents an α-phenylethyl radical or a tertiary butyl radical.

Finally, further compounds of the formula I with Y = NHR$_3$ and NHR$_4$ can be obtained according to methods which are in themselves known by modifying the substituents in R$_3$ and R$_4$ or by additional introduction of substituents into R$_3$ and R$_4$. Thus, for example, halogen atoms or nitro groups can be introduced and sulphuric acid ester groups or sulphamide groups can be introduced by sulphochlorination and subsequent reaction with amines or phenols. Similar remarks also apply to the substituents in the aryl radical, if Y = S-aryl.

Compounds of the formula I with Y = S-aryl can be obtained according to methods which are in themselves known, by replacing the halogen in compounds of the formula I, wherein Y = halogen, by arylmercaptans, preferably in organic solvents, preferably those of polar nature, for example alcohols or dimethylformamide, in the presence of alkaline agents, preferably alkali metal hydroxides or alkali metal carbonates.

Compounds of the formula I are outstandingly suitable for dyeing and printing synthetic fibres, such as polyacrylonitrile, cellulose ester, polyamide and above all polyester fibres. Polyester fibres can be dyed and printed in a manner which is in itself known, for example by the carrier, high temperature or thermosol processes, from organic solvents or by transfer printing.

Relatively "small" molecules, for example compounds of the formula I with Y = H, Cl, Br, or NH$_2$ and R with C$_{3-5}$ radicals are particularly suitable for transfer printing; somewhat "larger" molecules, for example compounds of the formula I with Y = NHR$_7$, in which R$_7$ represents hydrocarbon radicals with 1-6 C atoms, are preferentially suited to the exhaustion process and those with "larger" amine radicals, for example optionally substituted phenylamine radicals, are preferentially suitable for the high temperature process. Compounds in which Y represents an arylsulphonylamino radical are preferentially suitable for the thermosol process. For solvent dyeing, compounds of the formula I in which hydroxyl groups and/or sulphonyl groups are present in the radicals R and/or Y are above all suitable.

The dyeings and prints thus produced are distinguished by good general fastness properties. It is frequently particularly advantageous to employ mixtures of compounds of the formula I since they frequently distinctly surpass the pure components in their tinctorial properties, above all in affinity. Such mixtures can differ in respect of the position of the nitro group and/or in respect of the radical R and/or in respect of Y. The difference in hydrocarbon radicals can be either in the nature of the hydrocarbon radical or in the nature and position of the substituents in the hydrocarbon radicals. Such mixtures can be obtained either by reaction or by subsequent mixing of the pure components.

In addition, compounds of the formula I are valuable intermediate products for the preparation of further dyestuffs; thus, for example, acid dyestuffs for natural or synthetic polyamide fibres can be obtained by sulphonation and equally other disperse dyestuffs can be obtained by reduction of the nitro group or by replacing the nitro group, for example by alkoxy or hydroxyl groups.

EXAMPLE 1

650 g of 1,8-dinitroanthraquinone (78% strength, with 8.7% of 1,5-dinitroanthraquinone and 11.8% of 1,6- and 1,7-dinitroanthraquinone) are dissolved in 1,950 ml of nitrobenzene at 175°–180° and 950 ml of 70% strength aqueous isopropylamine solution are added dropwise under the surface of the liquid over the course of 4 hours, at the same temperature. The water is distilled off during the reaction and condensed on the descending condenser. The reaction is followed chromatographically and is stopped when only a little 1,8-dinitroanthraquinone remains detectable. The mixture is now stirred until cold and diluted with 1,000 ml of methanol and the product is filtered off cold, washed with 650 ml of a mixture of equal parts of nitrobenzene and methanol and finally with methanol until free of nitrobenzene, and dried at 70°–80°.

437 g of 1-isopropylamino-8-nitroanthraquinone = 81% of theory, are obtained.

Quality: 97% pure.

EXAMPLE 2

620 ml of 70% strength isopropylamine are added over the course of 1 hour to 400 g of 1,5-dinitroanthraquinone (84% strength, containing 12L % of 1,8-dinitroanthraquinone) in 2,000 ml of nitrobenzene at 180°–190° with vigorous stirring under reflux, until only a little starting material remains detectable by chromatography. The nitrobenzene is distilled off in vacuo at 130°–150° and the residue is dried further in a vacuum cabinet to remove residual nitrobenzene. 427 g of 5-nitro-1-isopropylamino-anthraquinone contaminated with 4.4% of 1,5-dinitroanthraquinone, 9.5% of 1.5-bisisopropylamino-anthraquinone and 8.3% of 8-nitro-1-isopropylamino-anthraquinone are obtained.

It can be freed of 1,5-dinitroanthraquinone by dissolving in 85% strength H$_2$SO$_4$ (undissolved material = 1,5-dinitroanthraquinone) and from the 1,5-bis product by lowering the concentration of the filtrate to 40–45% strength sulphuric acid (the bis-product remains dissolved).

EXAMPLE 3

175 ml of cyclohexylamine are added over the course of one hour to 300 g of 67% strength 1,8-dinitroanthraquinone in 1,200 ml of nitrobenzene at 175°–180°, the mixture is stirred for a further 15 minutes at the same temperature and then overnight until cold and the product is filtered off and washed with 200 ml of nitrobenzene and finally with a large amount of methanol until free of nitrobenzene. 187 g of 8-nitro-1-cyclohexylamino-anthraquinone of very good quality are obtained.

EXAMPLE 4

250 ml of cyclohexylamine are added dropwise over the course of 3 hours to a suspension of 500 g of a dinitroanthraquinone mixture (containing 49% of 1,5-dinitroanthraquinone and 38% of 1,8-dinitroanthraquinone) in 2,000 ml of nitrobenzene whilst constantly distilling off water/amine at 180°–190° C.

After evaporation of the reaction mixture in vacuo at 120°–150° C, 548 g of crude substance are obtained. After purification using sulphuric acid (solution in a five-fold amount by volume of 80% strength sulphuric acid, removal of undissolved dinitroanthraquinone, diluting the filtrate to 40% strength sulphuric acid and filtration) 380 g of a mixture of 1-cyclohexylamino-5- and 1-cyclohexylamino-8-nitroanthraquinone are obtained.

The following compounds are obtained, in the pure form or as mixtures, by one of the methods described in Examples 1–4: 1-butylamino-(2')-5- or -8-nitroanthraquinone, 1-hydroxy-(1')-butylamino-(2')-5- or -8-nitroanthraquinone, 1-methoxy-(1')-butylamino-(2')-5- or -8-nitroanthraquinone, 1-pentylamino-(3')-5- or -8-nitroanthraquinone, 1-pentylamino-(2')-5- or -8-nitroanthraquinone, 1-hexylamino-(2')-5- or -8-nitroanthraquinone, 1-(2'-methyl-cyclohexylamino)-5- or -8-nitroanthraquinone, 1-(3'-methyl-cyclohexylamino)-5- or -8-nitroanthraquinone, 1-(4'-methyl-cyclohexylamino)-5- or -8-nitroanthraquinone, 1-(4'-isopropyl-cyclohexylamino)-5- or -8-nitroanthraquinone, 1-(2'-tertiary butyl-4'-methyl-cyclohexylamino)-5- or -8-nitroanthraquinone, 1(2',4',6'-trimethyl-cyclohexylamino)-5- or -8-nitroanthraquinone, 1-(4'-methoxy-cyclohexylamino)-5- or -8-nitroanthraquinone, 1-(3'-isopropoxy-cyclohexylamino)-5- or -8-nitroanthraquinone, 1-(4'-acetylamino-cyclohexylamino)-5- or -8-nitroanthraquinone, 1-(3'-amino-cyclohexylamino)-5- or -8-nitroanthraquinone, 1-(4'-hydroxy-cyclohexylamino)-5- or -8- nitroanthraquinone, 1-(3'-chloro-cyclohexylamino)-5- or -8-nitroanthraquinone, 1-(4'-bromo-cyclohexylamino)-5- or -8-nitroanthraquinone, 1-[(4'-β-hydroxy-propionylamino)cyclohexylamino]-5- or -8-nitroanthraquinone, 1-[(4'-β-hydroxy-ethylmercapto)cyclohexylamino]-5- or -8-nitroanthraquinone and 1-(4'-methyl-3'-chloro-cyclohexylamino)-5- or -8-nitroanthraquinone.

EXAMPLE 5

9 ml of bromine are added dropwise over the course of 30 minutes at 15°–20° C to a solution of 28 g of 8-nitro-1-isopropylamino-anthraquinone obtained according to Example 1, in 300 ml of concentrated HCl, and the mixture is stirred further overnight at room temperature (no further starting material present, according to a thin layer chromatogram).

The mixture is poured into ice water and the product is filtered off, washed successively with water, 5% strength bisulphite solution and water until neutral, and dried in vacuo at 70° C.

34.3 g of 4-bromo-8-nitro-1-isopropylamino-anthraquinone are obtained. Bromine content: 20.8%.

EXAMPLE 6

50 ml of isopropylamine are added over the course of 1 hour to 50 g of a mixture of 1,6- and 1,7-dinitroanthraquinone (72% strength) in 170 ml of nitrobenzene under reflux at 95°–100°, excess amine is distilled off in vacuo at 130° (30 ml of distillate) and at 30° 53.5 g of bromine are added over the course of 10 minutes during which the temperature rises to approx. 50°. The mixture is stirred for a further 15 hours in the cold, slowly diluted with 150 ml of methanol and stirred for a further 30 minutes whilst cooling with ice, and the product is filtered off, washed with 50 ml of a mixture of equal parts of nitrobenzene and methanol, washed with methanol until free of nitrobenzene and finally with water, and dried.

43.6 g of a mixture of 4-bromo-6- and -7-nitro-1-isopropylamino-anthraquinone are obtained. It contains, as the sole impurity, 6% of b 4-bromo-8-nitro-1-isopropylaminoanthraquinone (produced from 1,8-dinitroanthraquinone, an impurity in the starting material).

EXAMPLE 7

9.3 g of a mixture of 1-cyclohexylamino-5- and 1-cyclohexylamino-8-nitroanthraquinone, obtained according to Example 4, are dissolved in 47 ml of nitrobenzene at 100° C and after cooling to 30°–40° C (suspension), 3.3 ml of sulphuryl chloride are added over the course of 20 minutes. The mixture is then stirred further at room temperature (approx. 5 hours) until no further starting material is detectable by chromatography. The reaction mixture is poured into 150 ml of methanol and stirred for some hours longer in an ice bath. The product is now filtered off, washed with methanol until free of nitrobenzene and dried in vacuo at 50°–60° C.

5.9 g of a mixture of 1-cyclohexylamino-4-chloro-5-nitro- and 1-cyclohexylamino-4-chloro-8-nitro-anthraquinone are obtained. Chlorine content: 9.9%.

EXAMPLE 8

28g of 1-(p-methylcyclohexyalmino)-7-nitroanthraquinone are dissolved in 56 ml of nitrobenzene at 120° C, 17.5 g of bromine are added over the course of ten minutes at below 20° C and the mixture is stirred for a further 4 hours. It is diluted with 56 ml of methanol and stirred for some hours longer and the product is filtered off, washed with methanol until free of nitrobenzene and dried.

28.8 g of 1-(p-methylcyclohexyalmino)-b 4-bromo-7-nitroanthraquinone are obtained.

The following compounds are obtained according to one of the methods described in Examples 5–8: 1-isopropylamino-4-chloro-5- or -8-nitroanthraquinone, 1-isopropylamino-4-chloro-6- or -7-nitroanthraquinone, 1-cyclohexyalmino-4-bromo-5- or -8-nitroanthraquinone, 1-cyclohexyalmino-4-bromo-6- or -7-nitroanthraquinone, 1-butylamino-(2')-4-bromo-5- or -8-nitroanthraquinone, 1-[hydroxy-(1')-butylamino-(2')]-4-bromo-6- or -7-nitroanthraquinone, 1-[methoxy-(1')-butylamino-(2')]-4-bromo-5- or -8-nitroanthraquinone, 1-pentylamino-(3')-4-chloro-5- or -8-nitroanthraquinone, 1-pentylamino-(2')-4-bromo-6- or -7-nitroanthraquinone, 1-hexylamino-(2')-4-bromo-6- or -7-nitroanthraquinone, 1-(4'-methyl-cyclohexylamino)-4-bromo-5- or -8-nitroanthraquinone, 1-(4'-isopropyl-cyclohexylamino)-4-bromo-6- or -7-nitroanthraquinone, 1-(2'-tert.-butyl-4'-methyl-cyclohexylamino)-4-chloro- 5- or -8-nitroanthraquinone, 1-(4'L -methoxy-cyclohexylamino)-4-bromo-5- or -8-nitroanthraquinone, 1-(3'-isopropoxy-cyclohexylamino)-4-bromo-6- or -7-nitroanthraquinone, 1-(3'-methyl-4'-methoxy-cyclohexylamino)-4-bromo-6- or -7-nitroanthraquinone, 1-(4'-hydroxycyclohexylamino)-4-bromo-5- or -8-nitroanthraquinone, 1-(3'-amino-cyclohexylamino)-4-bromo-6- or -7-nitroanthraquinone, 1-(3'-chloro-cyclohexylamino)-4-chloro-5- or -8-nitroanthraquinone, 1-(4'-bromo-cyclohexylamino)-4-bromo-6- or -7-nitroanthraquinone, 1-(4'-acetylamino-cyclohexylamino)-4-bromo-5- or -8-nitroanthraquinone and 1-[4'-(β-hydroxyethylmercapto)-cyclohexylamino]-4-bromo-6- or -7-nitroanthraquinone.

EXAMPLE 9 a. 60 g of 1-isopropylamino-4-bromo-8-nitroanthraquinone, obtained according to Example 5, 120 ml of m-toluidine, 20.5 g of potassium acetate and 0.05 g of Cu$^I$ chloride are warmed to 100°-105° C until only traces of the starting material remain detectable. The mixture is diluted with 240 ml of methanol at 60°-70° C and stirred additionally for some time at 50°-60° C and the product is filtered off hot, washed successively with hot methanol and hot water and dried at 100° C.

Yield: 45 g of 1-isopropylamino-4-m-toluidino-8-nitroanthaquinone.

b. If the procedure indicated above is followed but the 8-nitro compound is replaced by a mixtue of 1-isopropylamino-4-bromo-5- and -8-nitroanthraquinone and 180 g of p-anisidine are used instead of m-toluidine as the base, 48 g of a mixture consisting of 1-isopropylamino-4-p-anisidino-5-nitroanthraquinone and 1-isopropylamino-4-p-anisidine-8 -nitroanthraquinone are obtained after dilution with 300 ml of methanol and filtration at 10°.

EXAMPLE 10 a. 30 g of 1-cyclohexylamino-4-chloro-6-nitroanthraquinone, 90 ml of p-tert.-butylaniline, 9.6 g of potassium acetate, 0.2 g of copper$^I$ chloride and 0.05 g of iodine are heated at 120°-130° C until only a little starting material remains detectable (approx. 12 hours being required). The mixture is diluted with 135 ml of methanol and the product is filtered off cold and washed with methanol and hot water. 26 g of 1-cyclohexylamino-4-(p-tert.-butylanilino)-6-nitroanthraquinone are obtained.

b. If in (a), instead of the 6-nitro compound, a mixture of 1-cyclohexylamino-4-chloro-6- and -7-nitroanthraquinone is employed, a mixture of 1-cyclohexylamino-b 4-(p-tert.-butylanilino)-6- and -7-nitroanthraquinone is obtained in somewhat lower yield.

c. If in (a), instead of 1-cyclohexylamino-4-chloro-6-nitroanthraquinone, a stoichiometrically equal amount of 1-cyclohexylamino-4-bromo-7-nitroanthraquinone is employed, and the reaction is allowed to take place at 120°-130° instead of 100°-110°, 1-cyclohexyalmino-4-(p-tert.-butylanilino)-7-nitroanthraquinone is obtained.

EXAMPLE 11 a. 3.4 g of potassium acetate and 50 mg of Cu$^I$ chloride are added to 10 g of a mixture of 1-isopropylamino-4-bromo-6- and -7-nitroanthraquinone in 50 ml of cyclohexylamine and the whole is warmed for 6½ hours to 95°-100° C. It is diluted with 50 ml of ethylene glycol monomethyl ether and the product is filtered off at 80° C and washed successively with warm ethylene glycol monomethyl ether, methanol and water. 6.7 g of very pure 1-isopropylamino-4-cyclohexylamino-6- and -7-nitroanthraquinone are obtained.

b. If in (a), instead of 1-isopropylamino-4-bromo-6- and -7-nitroanthraquinone, an equal amount of 1-isopropylamino-4-bromo-8-nitroanthraquinone is employed, 1-isopropylamino-4-cyclohexylamino-8-nitroanthraquinone mixed with 1-isopropylamino-4-bromo-8-cyclohexylamino-anthraquinone is obtained.

EXAMPLE 12

10 g of a mixture of 1-cyclohexylamino-4-bromo-6- and -7-nitroanthraquinone, 40 ml of β-phenylethylamine, 3.2 g of potassium acetate and 0.1 g of copper$^I$ chloride are stirred for 4 hours at 75°-80° C. The mixture is diluted with 30 ml of methanol at 60° C and the product is filtered off at 60° C and washed successively with hot methanol and water. 8.2 g of a mixture of 1-cyclohexylamino-4-(β-phenylethylamino)-6-and -7- nitroanthraquinone are obtained.

EXAMPLE 13 a. 10 g of 1-(p-chlorocyclohexylamino)-4-bromo-7-nitroanthraquinone, 60 ml of n-butylamine, 2.5 g of K acetate, 50 mg of copper$^I$ chloride and a trace of copper are heated under reflux until only a little starting material remains detectable in a sample. The mixture is diluted with 35 ml of ethylene glycol monomethyl ether and the product is filtered off and washed with methanol and water. 6.5 g of 1-(p-chlorocyclohexylamino)-4-butylamino-7-nitroanthraquinone are obtained.

b. If in (a), instead of n-butylamine, an equal amount of isobutylamine-(2) is employed, 1-(p-chlorocyclohexylamino)-4-butylamino-(2')-7-nitroanthraquinone is obtained.

EXAMPLE 14

10 g of a mixture of 1-(p-hydroxy-cyclohexylamino)-4-p-anisidino-5- and -8-nitroanthraquinone - obtained analogously to Example 9b - in 100 ml of 80% strength H$_2$SO$_4$ are warmed to 40°-50° C until only a little starting material remains detectable. The mixture is stirred into 1,000 ml of water, the whole is stirred for a further hour whilst warm and the product is filtered off, washed until neutral and dried. 8.9 g of a mixture of 1-(p-hydroxy-cyclohexylamino)-4-(p-hydroxyanilino)-5- and -8-nitroanthraquinone are obtained.

EXAMPLE 15 a. 10 g of 1-butylamino-(2')-4-(p-acetylamino-anilino)-5- and -8-nitroanthraquinone and 200 ml of 38% strength hydrochloric acid are kept under reflux until no further starting material is detectable by chromatography. The mixture is diluted with 1,500 ml of water and the precipitate is filtered off, washed until neutral and dried. A mixture of 8.4 g of 1-butylamino-(2')-4-(p-amino-anilino)-5- and -8-nitroanthraquinone is obtained.

b. 2 g of isovaleryl chloride are added to 6 g of the product obtained in a) in 60 ml of pyridine at 40° C and the mixture is stirred until no further starting material is detectable. 60 ml of water are now added slowly at room temperature and the precipitate is filtered off, washed with water until neutral and dried. 6.8 g of mixture of 1-butylamino-(2')-4-(p-isovalerylaminoanilino)-5- and -8-nitroanthraquinone are obtained.

EXAMPLE 16 a. A mixture of 10 g of 1-isopropylamino-4-p-toluidino-6- and -7-nitroanthraquinone (obtained analogously to Example 10 from 1-isopropylamino-4-bromo-6- and -7-nitroanthraquinone and p-toluidine) is introduced into a mixture of 50 g of chlorosulphonic acid and 5 g of thionyl chloride at 0°-5° C. The mixture is then warmed to 50° C over the course of 1 hour, cooled and stirred into ice water and the product is filtered off and washed with cold water unil neutral.

The moist press cake (40 g) is introduced into 100 ml of γ-methoxy-propylamine at room temperature and the mixture is stirred until no further sulphochloride is detectable. It is diluted with 200 ml of a mixture of equal parts of methanol and water and the product is filtered off, thoroughly washed with water and dried. 7.8 g of a mixture of 1-isopropylamino-6- and -7-nitro-4-[(γ-methoxy-propylamino-sulphonyl)-p-toluidino]-anthraquinone are obtained.

b. If the sulphochloride from (a), whilst still moist, is introduced into a mixture of 100 g of acetone, 5 g of triethylamine and 10 g of phenol, 1-isopropylamino-4-(phenoxysulphonyl-p-toluidino)-6- and -7-nitroanthraquinone are obtainable by heating under reflux.

The following compounds can be obtained according to one of the methods described in Example 9-16: 1-isopropylamino-4-anilino-5- or -8-niroanthraquinone, 1-butylamino-(2')-4-o-toluidino-5- or -8-nitroanthraquinone, 1-pentylamino-(3')-4-(2',4',6'-trimethylanilino)-5- or -8-nitroanthraquinone, 1-[hydroxy-(1')-butylamino-(2')]-4-p-phenetidino-5- or -8-nitroanthraquinone, 1-[methoxy-(1')-pentylamino-(2')]-4-[-p-(β-hydroxy-ethoxy)-anilino]-5- or -8-nitroanthraquinone 1-isopropylamino-4-(p-bromo-anilino)-6- or -7-niroanthraquinone, 1-cyclohexylamino-4-(m-chloroanilino)-5- or -8-nitroanthraquinone, 1-(4'-tert.-butyl-cyclohexylamino)-4-[p-(β-cyanoethoxy)-anilino]-6- or -7-nitroanthraquinone, 1-(4'-methoxy-cyclohexylamino)-4-(p-cyclohexyl-anilino)-5- or-8-nitroanthraquinone, 1-(4'-acetylamino-cyclohexylamino)-4-(p-ethylthio-anilino)-5- or -8-nitroanthraquinone, 1-(4'-amino-cyclohexylamino)-4-(p-acetylamino-anilino)-5- or -8-nitroanthraquinone, 1-(4'-hydroxy-cyclohexylamino)-4-(m-amino-anilino)-5- or -8-nitroanthraquinone, 1-[4'-(β-hydroxyethylmercapto)-cyclohexylamino]-4-(m-chloro-p-methoxy-anilino)-6- or -7-nitroanthraquinone, 1-isopropylamino-4-(p-hydroxyanilino)-5- or -8-nitroanthraquinone, 1-isopropylamino-4-(β-phenylethylamino)-5- or -8-nitroanthraquinone, 1-isopropylamino-4-(γ-phenyl-α-methyl-propylamino)-6- or -7-nitroanthraquinone,1-cyclohexylamino-4-[1'-phenyl-5'-methyl-hexylamino-(3')]-6- or -7-nitroanthraquinone, 1-isopropylamino-4-(4'-methyl-cyclohexylamino)-6- or -7-nitroanthraquinone, 1-butylamino-(2')-4-(2'-methyl-4'-tert.-butyl-cyclohexylamino)-6- or -7-nitroanthraquinone, 1-isopropylamino-4-methylamino-6- or -7-nitroanthraquinone, 1-cyclohexylamino-4-hydroxyethylamino-6- or -7-nitroanthraquinone and 1-cyclohexylamino-4-tertiary butylamino-6- or -7-nitroanthraquinone.

EXAMPLE 17 a. A mixture of 7.8 g of 1-isopropylamino-4-bromo-5- and -8-nitroanthraquinone, 7.8 g of p-toluenesulphonic acid amide, 3.05 g of pottasium carbonate, 100 mg of copper powder, 100 mg of basic copper sulphate and 30 ml of o-oil is heated for about 15 minutes at 125°-130° C. According to a thin layer chromatogram, only traces of starting material remain present.

On pouring the reaction mixture into cold cyclohexane (200 mg) the product precipitates. It is filtered off and washed successively with cyclohexane and 70% strength methanol and dried in vacuo at 60° C.

9.0 g of crude product are obtained. Recrystallisation from pyridine/water gives 6.5 g of a mixture of 1-isopropylamino-4-p-toluenesulphamido-5-nitro-anthraquinone and 1-isopropylamino-4-p-toluenesulphamido-8-nitro-anthraquinone in which the residual contamination is slight.

b. If in (a), instead of the mixture of 1-isopropylamino-4-bromo-5(8)-nitroanthraquinone, a stoichiometrically equal amount of 1-cyclohexylamino-4-bromo-6-nitroanthraquinone is employed, 1-cyclohexylamino-4-p-toluenesulphamido-6-nitroanthraquinone is obtained in the same manner.

EXAMPLE 18 a. 10 ml of acetic anhydride are added to a mixture consisting of 19.2 g of a mixture of 1-isopropylamino-4-amino-5- and -8-nitroanthraquinone and 80 ml of pyridine at 50°-60° C and the whole is kept at this temperature until only traces of starting material remain.

After dilution with 160 ml of methanol, the mixture is stirred for some hours longer in an ice bath and the product is filtered off, washed with methanol and dried in vacuo at 60°-70° C.

15 g of a mixture of 1-isopropylamino-4-acetylamino-5-nitro- and 1-isopropylamino-4-acetylamino-8-nitroanthraquinone are obtained.

b. If in (a), instead of the mixture of 1-isopropylamino-4-amino-5(8)-nitroanthraquinone a stoichiometrically equal amount of 1-cyclohexylamino-4-amino-6-nitroanthraquinone is employed, and instead of acetic anhydride a stoichiometrically equal amount of acetyl chloride is employed, but the reaction is carried out at 20°-30° C, 1-cyclohexylamino-4-acethylamino-6-nitroanthraquinone is obtained.

The compounds employed in a) or b) can be obtained according to the following instructions.

c. 10 g of a mixture of 1-isopropylamino-4-p-toluenesulphonylamino-5- and -8-nitroanthraquinone, obtained according to Example 17, are introduced into 50 ml of 80% strength sulphuric acid over the course of 15 minutes and the mixture is warmed to 60° C and kept at this temperature for 30 minutes.

After working into a paste with ice water, the product is filtered off, washed until neutral and dried in vacuo at 60° C.

6 g of a mixture consisting of 1-ispropylamino-4-amino-5-nitro-anthraquinone and 1-isopropylamino-4-amino-8-nitro-anthraquinone are obtained.

1-Cyclohexylamino-4-amino-6-nitroanthraquinone is obtained in the same manner if the reaction product from Example 17b is employed.

d. 10 g of finely sieved 1-isopropylamino-4-(α-phenylethylamino)-5- and -8-nitroanthraquinone are stirred into 100 ml of 90% strength sulphuric acid over the course of 30 minutes, during which the temperature rises to 35°–40° C and the product dissolves. The solution is kept at 40° C until no further starting material is detectable chromatographically and is stirred into cold water and the product is washed until neutral, finally washed with methanol and dried. 7.4 g of a mixture of 1-isopropylamino-4-amino-5- and -8-nitroanthraquinone are obtained.

EXAMPLE 19

4.3 g of methanesulphonyl chloride was added to 10 g of 1-pentylamino-(3')-4-amino-6- and -7-nitroanthraquinone in 50 ml of N-methylpyrrolidone and the mixture is warmed to 90°–100° C until only traces of the starting material remain chromatographically detectable. The mixture is diluted with 150 ml of methanol and the product is filtered off cold, washed with methanol and water and dried.

8.7 g of 1-pentylamino-(3')-4-methylsulphonylamino-6- and -7-nitroanthraquinone are obtained.

EXAMPLE 20

5 ml of chloroformic acid ethyl ester are added dropwise to 10 g of 1-isopropylamino-4-amino-5-nitroanthraquinone in 50 ml of N-methylpyrrolidone at room temperature. 4 ml of triethylamine are then added dropwise and the mixture is stirred further, finally for a short time at 30°–40° C, until only small amounts of starting material remain detectable. After working up with methanol, 1-isopropylamino-4-ethoxycarbonylamino-5-nitroanthraquinone is obtained.

The following compounds are obtained according to one of the methods described in Examples 17–20: 1-isopropylamino-4-amino-6- and -7-nitroanthraquinone, 1-cyclohexylamino-4-amino-5- and -8-nitroanthraquinone, 1-[hydroxy-(1')-butylamino-(2')]-4-amino-6- and -7-nitroanthraquinone, 1-pentylamino-(3')-4-amino-5- and -8-nitroanthraquinone, 1-(4'-methylcyclohexylamino)-4-amino-6- and -7-nitroanthraquinone, 1-[methoxy-(1')-butylamino-(2')]-4-amino-5- and -8-nitroanthraquinone, 1-(2'-tert.-butyl-4'-methyl-cyclohexylamino)-4-amino-6- and -7-nitroanthraquinone, 1-(4'-methoxy-cyclohexylamino)-4-amino-5- and -8-nitroanthraquinone, 1-(3'-actylamino-cyclohexylamino)-4-amino-6- and -7-nitroanthraquinone, 1-(4'-bromo-cyclohexylamino)-4-amino-6- and -7-nitroanthraquinone, 1-[4'-(β-hydroxyethoxy)-cyclohexylamino]-4-amino-5- and -8-nitroanthraquinone, 1-isopropylamino-4-chloroacetylamino-5- and -8-nitroanthraquinone, 1-[hydroxy-(1')-butylamino-(2')]-4-(β-methyl-butyrylamino)-6- and -7-nitroanthraquinone, 1-(3'-chloro-cyclohexylamino)-4-(ethoxyacetylamino)-6- and -7-nitroanthraquinone, 1-isopropylamino-4-(β-phenoxy-acetyl-amino)-5- and -8-nitroanthraquinone, 1-(p-hydroxy-cyclohexylamino)-4-(p-methylphenylacetyl-amino)-5- and -8-nitroanthraquinone, 1-ispropylamino-4-cyclohexylcarbonylamino-6- and -7-nitroanthraquinone, 1-pentylamino-(2')-4-ethoxycarbonylamino-6- and -7-nitroanthraquinone, 1-cyclohexylamino-4-methylsulphonylamino-5- and -8-nitroanthraquinone, 1-(4'-acetamino-cyclohexylamino)-4-propylsulphonylamino-6-and -7-nitroanthraquinone, 1-isopropylamino-4-benzylsulphonylamino-6- and -7-nitroanthraquinone, 1-butylamino-(2')-4-cinnamoylamino-5- and -8-nitroanthraquinone, 1-[4'-(β-hydroxyethylmercapto)-cyclohexylamino]-4-phenylpropionylamino-6- and -7-nitroanthraquinone, 1-isopropylamino-4-(m-nitro-benzoylamino)-5- and -8-nitroanthraquinone, 1-cyclohexylamino-4-(m-nitro-p-methoxy-benzoylamino)-6- and -7-nitroanthraquinone, 1-(3'-propoxycyclohexylamino)-4-(p-ethylmercapto-m-chlorobenzoylamino)-5- and -8-nitroanthraquinone, 1-isopropylamino-4-(m-nitrophenylsulphonylamino)-5- or -8-nitroanthraquinone, 1-[hydroxy-(1')-butylamino-(2')]-4-(p-hydroxyphenylsulphonylamino)-6- and -7-nitroanthraquinone and 1-cyclohexylamino-4-(3'-methyl-5'-bromo-phenylsulphonylamino)-5- or -8-nitroanthraquinone.

EXAMPLE 21

A solution consisting of 3 ml of thiophenol, 12 ml of ethanol and 1.8 g of KOH is added dropwise at room temperature over the course of 15 minutes to a solution of a mixture of 7.8 g of 1-isopropylamino-4-bromo-5- and -8-nitroanthraquinone in 40 ml of dimethylformamide. The mixture is stirred further at room temperature until no starting material remains chromatographically detectable.

After pouring the reaction mixture into 200 ml of methanol, the whole is stirred overnight in an ice bath and the product is then filtered off, washed with methanol and dried in vacuo at 60° C.

6.1 g of a mixture of 1-isopropylamino-4-phenylmercapto-5-nitroanthraquinone and 1-ispropylamino-4-phenylmercapto-8-nitroanthraquinone are obtained.

The following compounds are obtained in accordance with the instruction given in Example 21: 1-cyclohexylamino-4-phenylmercapto-5- and -8-nitroanthraquinone, 1-isopropylamino-4-phenylmercapto-6- and -7-nitroanthraquinone, 1-butylamino-(2')-4-(p-methylphenylmercapto)-5- and -8-nitroanthraquinone, 1-[1'-methoxy-butylamino-(2')]-4-(m-chlorophenylmercapto)-6- and -7-nitroanthraquinone, 1-[1'-hydroxy-butylamino-(2')]-4-(p-ethoxyphenylmercapto)-5- and -8-nitroanthraquinone, 1-(m-methylcyclohexylamino)-4-(p-isopropoxy-phenylmercapto)-6- and -7-nitroanthraquinone, 1-(p-hydroxy-cyclohexylamino)-4-(p-tert.-butylphenylmercapto)-5- and -8-nitroanthraquinone and 1-isopropylamino-4-(p-amino-phenylmercapto)-5- and -8-nitroanthraquinone.

EXAMPLE 22 a. 10 g of polyethylene terephthalate hank material are dyed for 2 hours at 96°–98° C in a liquor of 400 ml of water, 0.4 g of the dyestuff mixture obtained according to Example 6, in a finely divided form, 3.4 g of a mixture of o-, m- and p-cresotic acid methyl ester and 0.6 g of a mixture of equal parts of an anionic dispersing agent and a non-ionic polyglycol ether, after addition of sulphuric acid until a pH value of 4.5 is reached, and the material is then rinsed and dried. A red-violet dyeing with good general fastness properties is obtained.

b. 10 g of a polyethylene terephthalate rag are dyed for 2 hours at 120°–130° C in a liquor of pH 4.5, consisting of 400 ml of water, 0.4 g of the dyestuff mixture of Example 11 in a very finely divided form, and 0.3 g of a mixture of equal parts of an anionic dispersing agent and a non-ionic polyglycol ether. After rinsing and drying, a clear blue dyeing is obtained.

c. If cellulose triacetate is treated according to one of the instructions given in (a) or (b), dyeings in similar shades are obtained.

d. A polyethylene glycol terephthalate fibre fabric is impregnated on a padder with a liquor which contains, in 1,000 ml, 20 g of the dyestuff of Example 10a, in a finely divided form, and 10 g of a polyether, known from Belgian patent specification No. 615,102, as a thermosol auxiliary.

The fabric is then squeezed out to a weight increase of 70% and is dried in a suspension jet dryer or in a drying cabinet at 80°-120° C. The fabric is then treated with hot air at 190°-200° C for approx. 45 seconds, in a stenter frame or a nozzle hot-flue and is then rinsed, optionally subjected to a reductive after-treatment and dried. The reductive after-treatment for the purpose of removing dyestuff residue superficially adhering to the fibres can be carried out by introducing the fabric at 25° C into a liquor containing 3-5 cm³/liter of sodium hydroxide solution of 38° C Be and 1-2 g/liter of hydrosulphite (concentrated) heating the liquor to 70° C over the course of approx. 15 minutes and leaving it at 70° C for a further 10 minutes. The fabric is then rinsed hot, and dried. A strongly greenish-tinged blue dyeing is obtained, which is distinguished by good fastness to light, thermofixing and washing, and good rub resistance. A very similar dyeing is obtained if instead of the polyethylene terephthalate fibres polyester fibres from 1,4-bis-hydroxy-methylcyclohexane and terephthalic acid are used.

e. A previously cleaned and thermoset polyethylene terephthalate fibre fabric is printed with a printing paste consisting of the following components: 40 g of a mixture of the dyestuff obtained according to Example 17a, 475 g of water, 465 g of crystal gum (1:2) and 20 g of sulphonated castor oil. Instead of crystal gum, an alginate thickener can also be used. To fix the dyestuff, the printed and dried goods are passed at 190°-200° C, over a high throughput stenter frame or through a condensing apparatus. The period of treatment is 30-60 seconds. The resulting fixed print is then rinsed cold, soaped with 1-2 g/liter of anionic detergent at 70°-80° C for approx. 10 minutes, rinsed first hot and then cold, and dried. A violet print which is distinguished by good fastness properties is obtained.

f. If a cellulose triacetate fabric is padded as in (d) and subsequently treated with hot air as described in (d), but at 220° C. a somewhat bluer dyeing of equally good fastness properties is obtained.

EXAMPLE 23 a. 100 g of a fabric texturised polyethylene terephthalate fibres are introduced, without prior cleaning, into a dye bath at room temperature which has been prepared from 2 g of the dyestuff obtained according to Example 14 and 1,000 g of tetrachloroethylene. The bath is heated to 115° C over the course of 10 minutes whilst vigorously circulating the liquor and is kept at this temperature for 30 minutes. The liquor is then separated off and the dyed material is rinsed with fresh solvent for 5 minutes at about 40° C. After separating off the rinsing liquor, the dyed material is centrifuged and dried in a stream of air. A strongly greenish-tinged blue dyeing of very good fastness to sublimation and good fastness to washing rub resistance is obtained.

An equivalent dyeing was obtained in the same manner on a fabric of polycyclohexane-dimethylene terephthalate fibres.

If the tetrachloroethylene is replaced by the same amount of 1,1,2-trichloroethane, an equivalent dyeing is obtained.

b. 100 g of a yarn of cellulose acetate filaments are introduced into a dye bath at room temperature which has been prepared from 1 g of the dyestuff used under (a), 1,000 g of tetrachloroethylene, 1.5 g of oleic acid ethanolamide, 1.5 g of oleyl alcohol heptaethylene glycol ether and 6 ml of water. The bath is warmed to 78° C over the course of 20 minutes and is kept at this temperature for 45 minutes.

After separating off the dyeing liquor and rinsing with fresh tetrachloroethylene, the dyed material is freed of adhering solvent by suction and by drying in a stream of air. A very similar dyeing to that in (a) is obtained.

EXAMPLE 24 a. 75 g of a mixture of equal parts of the dyestuffs obtained according to Examples 1 + 2, 50 g of an anionic dispersing agent, for example a ligninsulphonate or a condensation product of naphthalenesulphonic acid and formaldehyde, and 100 ml of water are mixed and converted into a finely divided form by grinding for 10 hours in a ball mill.

The dispersion thus obtained, which contains approx. 30% of crude dyestuff, is stable on storage.

b. The aqueous dispersion obtained according to (a) can be converted into a printing paste as follows: 50-200 g are worked into a paste with 400 g of a 10% strength carob bean flour ether thickener and 550-400 ml of water.

c. A paper is gravure-printed with this printing paste. If this paper is pressed against a textile of polyester fibres for 15-60 seconds at 200° C, a clear, violet-red print of good to very good fastness properties, above all very good fastness to light, is obtained.

EXAMPLE 25 a. 100 g of a dyestuff dispersion prepared according to the instruction of Example 24a, but using the dyestuff obtained according to Example 18c, are intimately mixed with 800 ml of water and 100 g of a 5% strength alginate thickener.

A cotton fabric web is impregnated with this dyestuff solution on a padder and is subsequently dried.

b. The cotton fabric obtained according to (a) is suitable for transfer printing, especially onto bulky materials, such as, for example, carpets of polyester fibres or polyamide fibres, which it dyes in clear violet-blue shades.

EXAMPLE 26 a. 40-50 g of the dyestuff obtained according to Example 6 are worked into a paste with 5-10 g of an emulsifier mixture of ethoxylated nonylphenol (4-12 mols of ethylene oxide) in water. 10 g of ethyl cellulose N4 (Hercules Powder) and 30-40 g of a maleate resin which has been prepared by condensation of colophony with maleic acid are added. The mixture is kneaded at 80°-100° C for approx. 2 hours and is subsequently ground on one of the customary mills. A dyestuff powder of fine particle size is obtained.

b. 200 g of the dyestuff powder obtained according to (a) are added, whilst stirring, to a mixture of 730 g of ethanol, 50 g of ethylene glycol and 20 g of ethyl cellulose N22 (Hercules Powder).

c. A paper can be gravure-printed with the printing ink thus obtained. Cellulose acetate textiles, for example knitted fabrics, can be printed from these printed papers by the transfer process, and clear red-violet prints are obtained.

We claim:

1. Compound of the formula

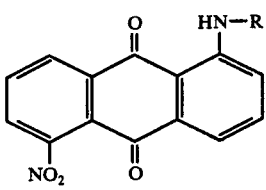
or
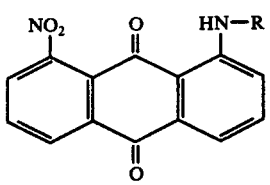
in which
R is cycloalkyl or
and $R_1$ and $R_2$ are alkyl.
2. Compound of claim 1 in which R is
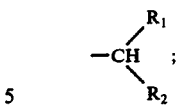
and $R_1$ and $R_2$ are $C_1$-$C_4$-alkyl.
3. The compound of claim 1 in which R is
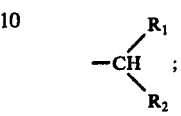
and $R_1$ and $R_2$ are methyl.
4. The compound of claim 1 in which R is cyclohexyl.
5. Compound of the formulae
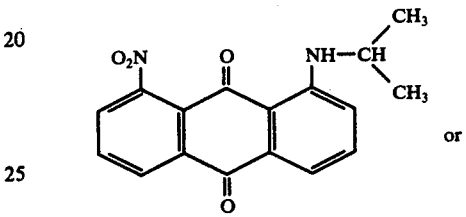
or
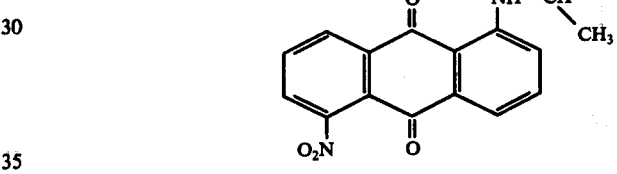
and mixtures thereof.